(12) United States Patent
Kawakoya et al.

(10) Patent No.: US 12,399,961 B2
(45) Date of Patent: Aug. 26, 2025

(54) PROGRAM PROTECTION APPARATUS, PROGRAM PROTECTION METHOD, AND PROGRAM PROTECTION PROGRAM

(71) Applicant: NIPPON TELEGRAPH AND TELEPHONE CORPORATION, Tokyo (JP)

(72) Inventors: Yuhei Kawakoya, Musashino (JP); Makoto Iwamura, Musashino (JP); Jun Miyoshi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 284 days.

(21) Appl. No.: 18/024,515

(22) PCT Filed: Oct. 9, 2020

(86) PCT No.: PCT/JP2020/038353
§ 371 (c)(1),
(2) Date: Mar. 3, 2023

(87) PCT Pub. No.: WO2022/074837
PCT Pub. Date: Apr. 14, 2022

(65) Prior Publication Data
US 2023/0325477 A1     Oct. 12, 2023

(51) Int. Cl.
*G06F 21/14*     (2013.01)

(52) U.S. Cl.
CPC ............................ *G06F 21/14* (2013.01)

(58) Field of Classification Search
CPC .................................................. G06F 21/14
USPC ....................................................... 726/22
See application file for complete search history.

(56) References Cited

U.S. PATENT DOCUMENTS

| | | | | | |
|---|---|---|---|---|---|
| 6,006,328 A | * | 12/1999 | Drake | ............... | H04L 63/0428 |
| | | | | | 713/188 |
| 2011/0035731 A1 | * | 2/2011 | Pericin | ............... | G06F 11/0715 |
| | | | | | 717/129 |

FOREIGN PATENT DOCUMENTS

JP    3033562 B2    4/2000

OTHER PUBLICATIONS

Min Gyung Kang, et al., "Renovo: A Hidden Code Extractor for Packed Executables", Nov. 2, 2007, [online], [retrieved Oct. 9, 2020], http://bitblaze.cs.berkeley.edu/papers/renovo.pdf, 8 pages.

* cited by examiner

*Primary Examiner* — Michael S McNally
(74) *Attorney, Agent, or Firm* — XSENSUS LLP

(57) ABSTRACT

The program protection device (100) includes an encoding unit (133) and an output unit (135). An encoding unit (133) encodes a program to be protected according to a specific encoding algorithm, and stores information used for decoding the encoded program in a relocation table of the encoded program. The output unit (135) outputs the program encoded by the encoding unit (133) as a protected program.

9 Claims, 6 Drawing Sheets

PROGRAM PROTECTION APPARATUS, PROGRAM PROTECTION METHOD, AND PROGRAM PROTECTION PROGRAM

CROSS-REFERENCE TO RELATED APPLICATION

The present application is based on PCT filing PCT/JP2020/038353, filed Oct. 9, 2020, the entire contents of which are incorporated herein by reference.

TECHNICAL FIELD

The present invention relates to a program protection device, a program protection method, and a program protection program.

BACKGROUND ART

Some of the program software include assets that are not desired to be known by the user, such as intellectual property, secret algorithm, and encryption key information. Therefore, a method for protecting such assets from analysis of programs such as reverse engineering has been required.

Methods of analyzing programs include dynamic analysis and static analysis. The dynamic analysis causes the program to operate on an environment in which a tool for observing the behavior of the program is installed, and analyzes the program on the basis of the observed behavior. On the other hand, static analysis involves loading the program into a reverse engineering tool, such as a reverse code engineering (RCE) tool, and the loaded program is made into a form of information that can be understood by humans and tools through disassemble, restoration of program structure, function recognition, and decompilation, and then analyzes the meaning of this information.

In order to protect the program from static analysis, the following two protection methods are used, for example.

The first method of protection is to encode the program to be protected with a specific value (key) and a specific algorithm, and to provide the program with a decoder that decodes the encoded value at program execution.

In the first protection method, when execution of the protected program is initiated, the decoder is first executed, the decoder decodes the encoded value, and the decoded value is written back to its original location. This decoded value (i.e., the original program) is then executed. According to such a protection method, the protected program is stored on the disk in an encoded form of the program. Therefore, the first protection method cannot analyze the program to which the static analysis is applied.

The second protection method is a method for converting a program to be protected into another program having a unique specification, and imparting an interpreter virtual machine capable of interpreting the unique specification to the program.

In the second protection method, the program to be protected performs the same operation as the original program, but is converted into a program based on the unique specification, that is, the specification which is not generally obvious. The converted program is executed only on an interpreter virtual machine which can interpret and execute the program.

Therefore, a static analysis tool designed to analyze a general program whose specification is obvious cannot analyze the program converted to the unique specification.

CITATION LIST

Patent Literature

[NPL 1] Min Gyung Kang, Pongsin Poosankam, Heng Yin, "Renovo: A Hidden Code Extractor for Packed Executables", [online], [retrieved Oct. 9, 2020], (http://bitblaze.cs.berkeley.edu/papers/renovo.pdf)

SUMMARY OF INVENTION

Technical Problem

However, there is room for improvement in a method for protecting a program from static analysis as described above. For example, the two protection methods described above have the following problems.

In the first protection method described above, as indicated in the NPL 1, the original program (i.e., the original code) can be extracted from the protected program by combining static analysis with dynamic analysis. In the method of the NPL 1, a protected program is executed, and after a process for executing the protected program executes an original entry point (execution start point of the program), both a memory portion to be written, and a memory portion to be executed by the process, are monitored.

More specifically, in the method of the NPL 1, when the process marks a memory portion where data is written after the original entry point, and the process tries to execute the memory portion where the process marks, the execution of the process is stopped. In the method of the NPL 1, the code developed on the memory is written into the file. By using such a method, a decoder of the protected program operates, a user can decode the encoded value into an original value, and acquire a state of the memory after writing back the original value to a corresponding place, and as a result, the original code of the protected program is extracted.

In the second protection method described above, since the converted program is executed while being interpreted on the successively executable interpreter virtual machine, there is a possibility that the execution speed of the program is greatly reduced. When the compiled program is an input object, it is generally difficult to completely perform program conversion of a binary program from which debugging information is deleted. Therefore, in the second protection method, all portions of the program may not be converted, and there is a possibility that portions not to be protected remain.

The present invention has been made to solve the above-described problems, and aims to improve the protection of the program.

Solution to Problem

A program protection device according to an embodiment of the present disclosure includes an encoding unit that encodes a program to be protected according to a specific encoding algorithm and stores information used to decode the encoded program in a relocation table of the encoded program, and an output unit for outputting the program encoded by the encoding unit as a protected program.

Advantageous Effects of Invention

According to one aspect of the embodiment, protection of the program can be improved.

DESCRIPTION OF EMBODIMENTS

Figure 1:
FIG. 1 is a diagram showing an overview of the use of a program protection device according to an embodiment.

Hereinafter, an embodiment of the present disclosure will be described in detail with reference to the drawings. Note that this embodiment is not intended to limit the scope of the present invention. Details of one or more embodiments are described in the following description and drawings. Further, the plurality of embodiments can be appropriately combined within a range in which the processing contents are not contradictory to each other. In the following one or more embodiments, the same parts are denoted by the same reference signs, and redundant description is omitted.

[1. Summary]

In the present section, a summary of some implementations described herein will be described. This outline is provided for the convenience of a reader and is not intended to limit the present invention and the embodiments described in the following sections.

Conventionally, a static analysis method such as reverse engineering is known as a method for analyzing a program. Various anti-reverse engineering methods have been proposed to protect programs from static analysis techniques. One of the anti-reverse engineering methods includes a protection method for encoding a program with a specific value (key) and a specific algorithm, and to give this program a decoder that decodes the encoded value (the first protection method described above).

However, when a program is encoded in such a protection method, the original program may be analyzed by a combination of static and dynamic analysis. Specifically, when the protected program itself writes to memory and the newly written memory portion is executed, this memory portion is identified as a portion corresponding to the code or data of the original program. Such analysis methods are discussed in detail, for example, in NPL 1 above.

Therefore, in order to protect a program from the analysis method combining static and dynamic analysis as described above, a program protection device according to an embodiment encodes a program to be protected without causing a protected program to generate a memory portion corresponding to the code and data of an original program by itself.

First, the program protection device according to the embodiment encodes a program according to an encoding algorithm using information determined at the time of executing the program. An example of such an encoding algorithm is an encoding algorithm using an address to which a program is loaded (i.e., base address) as information determined at the time of executing the program. For example, the encoding algorithm is an expression defining how codes and data stored in offsets on a loaded program are rewritten by using a base address.

Then, the program protection device stores information required for decoding the encoded program in a relocation table of the program.

A relocation table indicates, which parts of a program are to be rewritten, and how those parts are to be rewritten, according to information determined at program execution time. For example, the relocation table indicates how the code and data in the object file will be relocated to the actual address depending on the address at which the program was loaded (i.e., the base address).

The program protection device stores information required for decoding a code or data corresponding to an encoded portion of a program as an entry of a relocation table (i.e., rows of the table), and stores in the relocation table. The entry of the relocation table indicates which part of the program is to be rewritten and which part of the program is to be decoded. Further, the relocation table for storing the information indicates how to decode the portion.

Thereafter, the program protection device outputs a program in which information required for decoding the encoded program is stored in the relocation table as a protected program.

When the protected program is executed, the loader rewrites the program on the basis of the relocation table of the protected program, and as a result, the protected program is decoded. Thus, the program protection device can cause not the protected program itself but the loader to decode the protected program, thus, it is possible to enhance the resistance to analysis of a program combining the static analysis and the dynamic analysis as described above.

In addition, the program protection device can convert a program into a program that is decoded by a general loader, rather than a program based on its own specification (e.g., a program that is executed while being interpreted on a sequentially executable interpreter virtual machine). Thus, the program protection device can also avoid slowing down the execution speed of the program and avoid omissions in the protection of the program.

[2. Use of Program Protection Device]

First, an explanation of the use of the program protection device according to an embodiment will be described with reference to FIG. 1.

FIG. 1 illustrates an overview of the use of the program protection device 100. As shown in FIG. 1, the input of the program protection device 100 is a protection target program. The output of the program protection device 100 is a protected program. The protection target program is the program includes assets that are not desired to be known by a user, for example, for example, intellectual property, secret algorithm, encryption key information.

When a program manager inputs a protection object program to the program protection device 100, the program protection device 100 performs program protection to the protection object program. Then, the program protection device 100 outputs the protected program to a program manager.

The protection target program to be input is, for example, a compiled program according to the ELF (Executable and Link Format) format. The compiled program includes a code and data. In this example, the protected program to be output is also a compiled program according to the ELF format, and includes codes and data.

The code of the protection target program is different from the code of the protected program. The data of the protection target program is different from the data of the protected program. Therefore, the conventional static analysis tool is not effective for the protected program.

Although the program protection device 100 outputs a protected program including codes and data as an example for explanation, the present invention is not limited to this. As one of the utilization forms of the program protection device 100, it is also possible to output a protected program so as not to include any code in the protected program.

Further, in the above-mentioned utilization mode, the compiled program is described as a protection target program, the protection target program is not limited to this. The protection target program to be input may be a source code. The program protection device 100 may generate a built file from the source code. The program protection device 100 may output a protected program by performing program protection to the built file. In this way, the source code may be used as an input to the program protection device 100.

[3. Configuration of Program Protection System]

An example of a configuration of a program protection system according to the present embodiment will be described with reference to FIG. 2.

Figure 2:
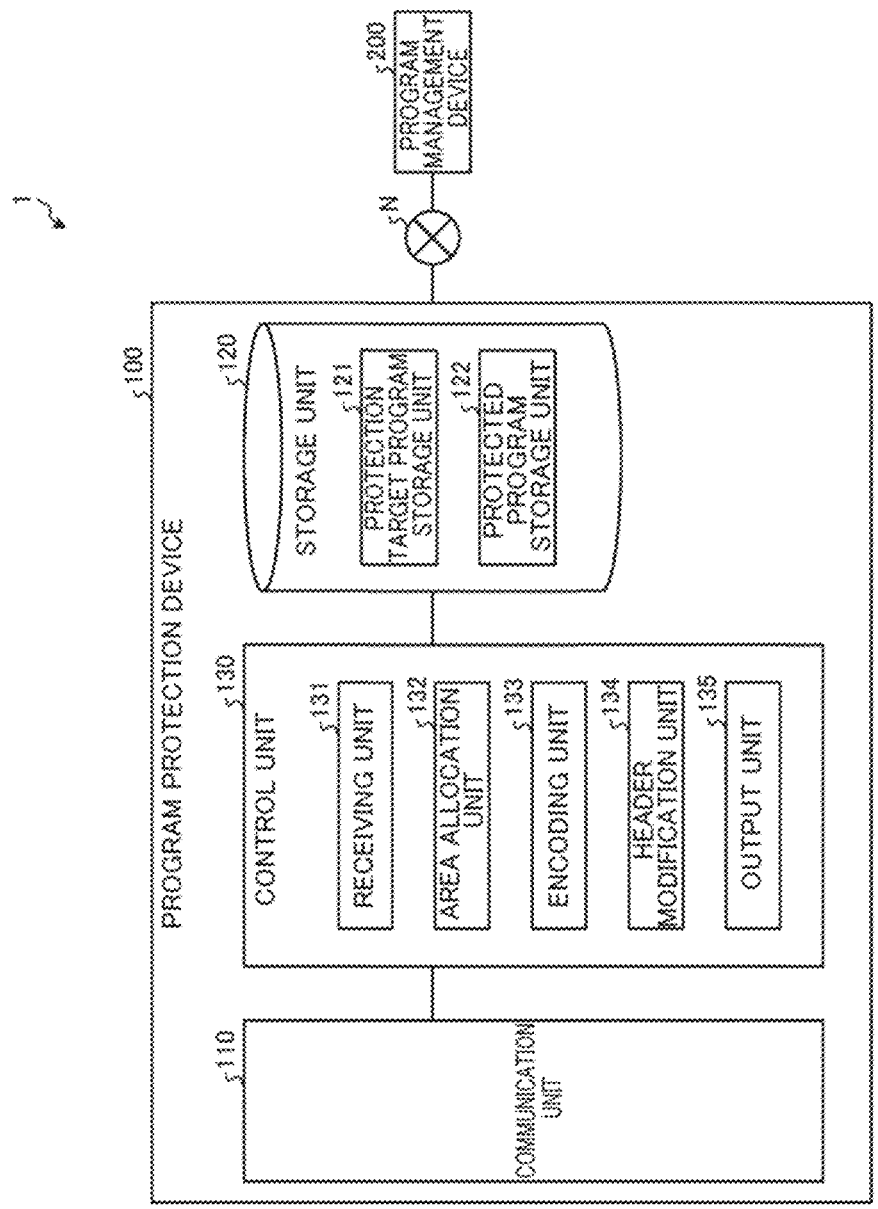
FIG. 2 is a diagram showing an example of a configuration of a program protection system according to an embodiment.

FIG. 2 is a diagram showing an example of a program protection system 1 according to an embodiment. As shown in FIG. 1, the program protection system 1 includes a program protection device 100 and a program management device 200. Although not shown in FIG. 2, the program protection system 1 may include a plurality of program protection devices 100 and a program management device 200.

In a program protection system 1, a program protection device 100 and a program management device 200 are connected to a network N by wire or radio, respectively. The network N is, for example, a network such as the internet, a WAN (Wide Area Network), a LAN (Local Area Network), and the like. The components of the program protection system 1 can communicate with each other via a network N.

[3-1. Component]

The program protection device 100 is an information processing device that executes processing for protecting a program. The program protection device 100 may be an information processing device of any type including a server. An example of the configuration of the program protection device 100 will be described in detail below.

The program management device 200 is an information processing device used by a program manager. The program manager requests the program protection device 100 to protect the program. For example, the program administrator sends the program he/she has developed to the program protection device 100 for anti-reverse engineering. The program management device 200 may be an information processing device of any type including a client device.

[3-2. Configuration of Program Protection Device]

Next, a description will be given of the configuration of the program protection device 100.

As shown in FIG. 2, the program protection device 100 includes a communication unit 110, a storage unit 120, and a control unit 130. The program protection device 100 may also have an input unit (e.g., keyboard, mouse, etc.) for receiving various operations from an administrator or other person using the program protection device 100, and a display unit (organic EL (Electro Luminescence), liquid crystal display, etc.) for displaying various kinds of information.

(Communication Unit 110)

The communication unit 110 is realized by, for example, an NIC (Network Interface Card). The communication unit 110 is connected to a network by wire or radio. The communication unit 110 may be communicably connected to the program management device 200 via a network N. The communication unit 110 can transmit and receive information to and from the program management device 200 via a network.

(Storage Unit 120)

The storage unit 120 is realized using a semiconductor memory element such as a RAM (Random Access Memory) or a flash memory, or a storage device such as a hard disk or an optical disk. As shown in FIG. 2, the storage unit 120 includes a protection target program storage unit 121 and a protected program storage unit 122.

(Protection Target Program Storage Unit 121)

The protection target program storage unit 121 stores protection target programs. The protection target program storage unit 121 stores the protected program received by the receiving unit 131 described later.

(Protected Program Storage Unit 122)

The protected program storage unit 122 stores the protected program. The protected program storage unit 122 stores the protected program output by the output unit 135 described later.

(Control Unit 130)

The control unit 130 is a controller, which is realized by executing various programs (corresponding to an example of a program protection program) stored in a memory device inside the program protection device 100 in using RAM, etc. as a work area by a processor such as a CPU (Central Processing Unit), MPU (Micro Processing Unit), or the like. Further, the control unit 130 may be realized by integrated circuits, for example, an ASIC (Application Specific Integrated Circuit), a FPGA (Field Programmable Gate Array), GPGPU (General Purpose Graphic Processing Unit), or the like.

As shown in FIG. 2, the control unit 130 includes a receiving unit 131, an area allocation unit 132, an encoding unit 133, The header modification unit 134 and the output unit 135 are provided, and the functions and operations of the information processing described below are realized or executed. One or more processors of the program protection device 100 can implement functions of each control unit in the control unit 130 by executing instructions stored in one or more memories of the program protection device 100. The internal configuration of the control unit 130 is not limited to the configuration shown in FIG. 2, but may be other configurations as long as it performs information processing to be described later. For example, the encoding unit 133 may perform all or part of information processing to be described later on parts other than the encoding unit 133.

(Receiving Unit 131)

The receiving unit 131 receives the protection target program from the program management device 200. The receiving unit 131 stores the received protection object program in a protection target program storage unit 121.

(Area Allocation Unit 132)

An area allocation unit 132 acquires a protection target program from the protection target program storage unit 121. Then, an area allocation unit 132 allocates an area for arranging information to be used for performing program protection to the protection target program to the protection target program.

An area allocation unit 132 allocates an area for arranging the relocation table to the protection object program. An area allocation unit 132 secures an area (memory area) for arranging a relocation table generated by an encoding unit 133, which will be described later, in the protection target program. As will be described later, the encoding unit 133 encodes the protection target program and stores the encoded value in the relocation table.

The above-mentioned relocation table is one of the information included in the program header. When the program is configured depending on information determined at the time of execution of the program, the relocation table is a table in which information determined at the time of execution of the program is stored. An example of information determined at the time of executing the program is a base address.

Specifically, the relocation table consists of one or more entries. Each entry consists of three pieces of information; 1) the location where the information to be determined at program execution time is needed, 2) the method of calculating the information to be determined at program execution time, 3) the values and related information needed to calculate the information to be determined at program execution time. The first of these three pieces of information is, for example, position information (offset) in the program. The second piece of information is, for example, an identifier indicating the type of relocation information (relocation entry type). The third information is, for example, information used for calculating the relocation information.

As an example of explanation, it is assumed that the program is an executable file in the ELF format. However, the program is not limited to executable files in the ELF format. The program protection device 100 according to the embodiment is applicable to an execution file of a PE (Portable Executable) format or an execution file of another format.

The following three methods are available for securing an area for arranging the relocation table described above.

The first method is a method of overwriting an existing relocation table of a program to be protected. The second method is to find a location in the protected program that holds information that is not needed when the protected program is executed, and overwrite the relocation table at that location. The third method is a method of securing a new area in the protection target program and writing the relocation table in the new area.

As to the first method, when the format of the protection target program is the ELF format, the sections such as rel.dyn and .rela.dyn are the areas in which the existing relocation table is stored. When the area storing the existing relocation table has a size sufficient to hold the value of the encoded program, the area allocation unit 132 may overwrite the existing relocation table. In this way, the area allocation unit 132 can use the existing relocation table as an area for arranging a new relocation table.

As for the second method, for example, the symbol information (.symtab section) is information required only at the time of debugging and is not information required for executing the program. When the portion storing information not required for executing the program has a size sufficient to hold the relocation table, the area allocation unit 132 may overwrite information not required for executing the program with the relocation table. In this way, the area allocation unit 132 can use a portion holding information which is not required when executing the protection target program as an area for arranging a new relocation table.

For the third method, the area allocation unit 132 may add a new section of an arbitrary size. The area allocation unit 132 may write the relocation table in a new section.

The first and second methods depend on the configuration of the protection target program, the size of an available area, and the like. On the other hand, the third method has the advantage that the size can be arbitrarily manipulated. However, the third method may have a drawback that the entire size of the protected program tends to increase.

(Encoding Unit 133)

An encoding unit 133 encodes the protection object program according to a specific encoding algorithm. Then, an encoding unit 133 stores information used for decoding the encoded protection target program in a relocation table of the protection target program. For example, the encoding unit 133 creates an entry including information used for decoding the encoded protection target program in a relocation table arranged in the area allocated by the area allocation unit 132.

First, the encoding unit 133 reads a portion to be encoded from the protection target program. Then, the encoding unit 133 encodes the read part. Then, an entry of a relocation table including information used to decode the encoded portion is created. Thereafter, the encoding unit 133 writes the created entry into the memory area secured by the area allocation unit 132.

As an example of explanation, it is assumed that the portion to be encoded is the whole of the .text area (.text section) of a 32-bit program in ELF format. Further, it is assumed that the encoding unit 133 encodes the .text area of the program by using R_386_RELATIVE as the relocation entry type. The relocation entry of R_386_RELATIVE performs an operation of adding the address (base address) to which the protection target program is loaded and the value stored in the memory area denoted by offset, and writing the obtained value back to the offset.

Figure 3:
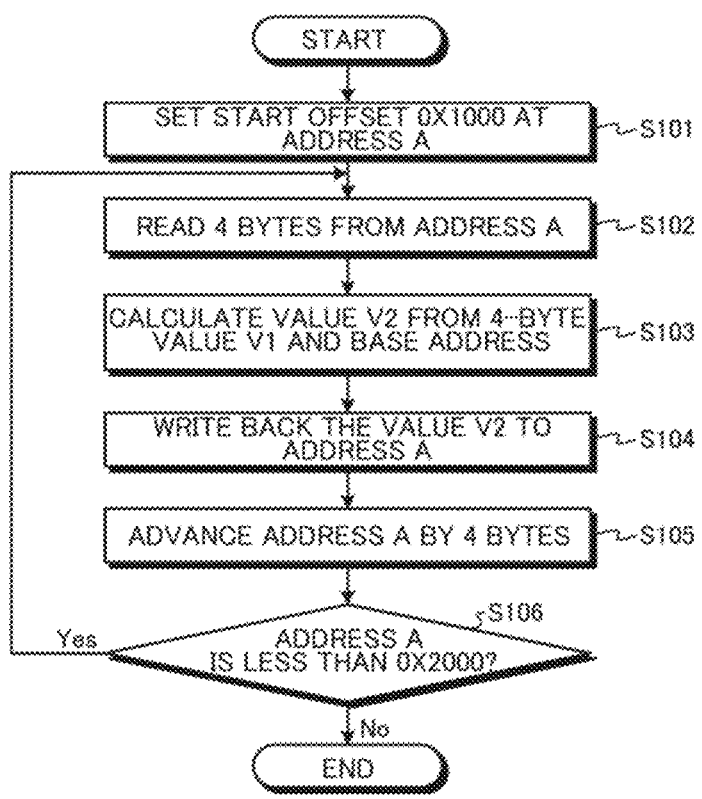
FIG. 3 is a flowchart showing an example of processing for encoding a protection target program executed by the program protection device according to an embodiment.

FIG. 3 is a flowchart showing an example of processing for encoding a protection target program executed by the program protection device 100 according to the embodiment. In the example shown in FIG. 3, it is assumed that the .text section of the above-mentioned protection target program is composed of an instruction string of 0x1000 bytes from 0x1000 to 0x2000. Further, it is assumed that the base address when the protection object program is executed is 0xdeadbeef.

First, an encoding unit 133 of the program protection device 100 sets a start offset 0x1000 to an address a (step S101). 0x1000 denotes a start offset of the .text section of the protection target program.

Next, an encoding unit 133 reads four bytes from the address (a) (step S102).

Then, an encoding unit 133 calculates a value V2 from the value V1 of 4 bytes and the base address of the protection object program (step S103).

The value V2 is calculated so that the value V1 is restored when the loader performs the processing of the relocation table. That is, the relationship between the value V2 and the value V1 is given by "V2=V1−0xdeadbeef". The loader executes a calculation of "V2+0xdeadbeef=V1" on the basis of information indicating a relationship between the value V2 and the value V1 stored in the relocation table.

Then, the encoding unit 133 writes back the value V2 to the address (a) (step S104).

Then, an encoding unit 133 advances the address (a) by four bytes (step S105).

Then, the encoding unit 133 determines whether the current address (a) is less than 0x2000 or not (step S106).

When it is determined that the current address (a) is less than 0x2000 (step S106: YES), and the encoding unit 133 executes the step S102 again. When it is determined that the current address (a) is equal to or more than 0x2000, the process for encoding the program to be protected is ended (step S106: No).

In the example shown in FIG. 3, the protection target program is a 32-bit program, but it is not limited to this. The program protection device 100 according to the embodiment is applicable to a 64-bit program.

It is also possible to use the type of relocation entry other than R_386_RELATIVE. For example, when R_386_JMP_SLOT is used as the type of the relocation entry, the encoding unit 133 can use the value of a particular symbol for encoding in place of the above-mentioned "base address+node offset". Thus, the encoding unit 133 can use each relocation entry type for encoding by changing the calculation of encoding according to the relocation entry type.

For storing information used for decoding the encoded protection target program in the relocation table, the encoding unit 133 adds, to the relocation table, a relocation entry in which an offset 0x1000 is associated with a type R_386_RELATIVE of the relocation entry, for example. This allows the loader to identify the address to be decoded from the address in memory based on the offset 0x1000 stored in the relocation table and the base address. Then, the loader can rewrite a value existing in the specified address to a value originally existing in the specified address on the basis of the type R_386_RELATIVE of the relocation entry associated with the offset 0x1000.

In the above-described embodiment, the encoding unit 133 encodes the whole of the .text area (.text section) of the program to be protected, but it is not limited to this. The encoding unit 133 may encode a part of the code or data of the protection target program. For example, the encoding unit 133 may modify the instruction sequence and data involved in determining the branching conditions by means of a relocation table. This allows the encoding unit 133 to perform processes such as modifying the branching that is statically visible and the branching conditions that are calculated when the program is actually executed.

The target of encoding is not limited to the code and data of the protection target program. The object to be encoded may be a specific value of an entry of the relocation table created by the encoding unit 133. That is, the protection by the encoding unit 133 may target information used to decode the encoded protected program.

Figure 4:
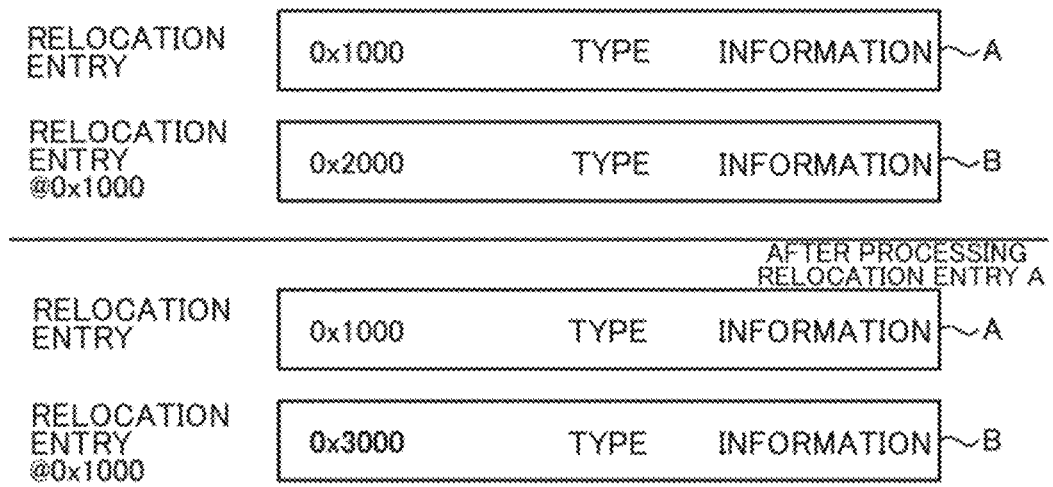
FIG. 4 is an explanation diagram showing an example of processing for encoding a protection target program.

FIG. 4 is a diagram showing an example of a encode processing that encodes the protection target program. In the example shown in FIG. 4, the protection target is a specific value of the entry of the relocation table created by the encoding unit 133. As shown in FIG. 4, the relocation table has relocation entry A and relocation entry B. Each relocation entry includes the offset, the type of relocation entry, and the information used to calculate the relocation information.

An encoding unit 133 sets the offset of the relocation entry a at a position where the information of the relocation entry B is stored, thereby changing the value of the relocation entry B when executing the protected program.

In the example shown in FIG. 4, the encoding unit 133 sets the offset 0x1000 of the relocation entry A at the position of the relocation entry B. Further, the encoding unit 133 operates the type and information of the relocation entry B so that the offset of the relocation entry B can be rewritten from 0x2000 to 0x3000. This 0x2000 is a dummy offset. On the other hand, 0x3000 is a portion to be decoded by the relocation entry B.

When the relocation entry A is processed by the loader in the above state, the offset value of the relocation entry B is modified and rewritten to 0x3000. When the relocation entry B is processed by the loader as it is, the value stored in the memory area to which the offset 0x3000 refers is rewritten to an assumed value.

Thus, the encoding unit 133 can adjust the relocation entry so that the relocation table for processing to be originally performed appears dynamically by setting the relocation entry in multiple stages.

(Header Modification Unit 134)

A header modification unit 134 corrects the header information of the encoded program. A header modification unit 134 corrects required header information in accordance with the relocation table created by the area allocation unit 132 and the encoding unit 133.

A header modification unit 134 modifies header information used a dynamic link in the encoded programs on the basis of a relocation table storing information used for decoding the encoded program. For example, when the encoded program is an ELF format execution file, a header modification unit 134 changes a value of .dynamic section of an ELF header, and the position of a new relocation table is designated.

(Output Unit 135)

An output unit 135 outputs the program encoded by the encoding unit 133 as a protected program. An output unit 135 stores the program encoded by the encoding unit 133 in a protected program storage unit 122 as a protected program.

The output unit 135 may acquire a protected program from the protected program storage unit 122. The output unit 135 may transmit the protected program to the program management program management device 200.

The output unit 135 may execute a protected program. In this case, the output unit 135 may decode the protection target program on the basis of the relocation table of the protected program. That is, the output unit 135 may be implemented as a loader of the program protection device 100. The loader may be a loader of a general-purpose OS (Operating System). The output unit 135 may transmit the execution result of the protected program to the program management device 200.

[4. Flow of Program Protection Processing]

Next, a procedure of the program protection processing by the program protection device 100 according to the present embodiment will be described with reference to FIG. 5.

Figure 5:
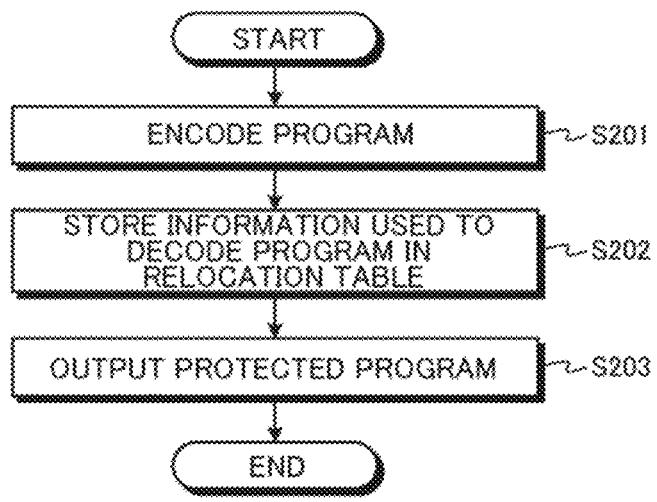
FIG. 5 is a flowchart showing an example of a processing for protecting a program executed by the program protection device of the embodiment.

FIG. 5 is a flowchart showing an example of a processing for protecting a program that is executed by the program protection device 100 according to the present embodiment.

As shown in FIG. 5, first, the encoding unit 133 of the program protection device 100 encodes a program (step S201).

For example, the encoding unit 133 encodes a program to be protected according to a specific encoding algorithm. The encoding unit 133 may encode the entire program (code and data) to be protected. Alternatively, the encoding unit 133 may encode a part of the code or data. As described above with reference to FIG. 4, the encoding unit 133 may encode the entry of the relocation table.

Then, the encoding unit 133 stores information used for decoding the program in a relocation table of the program (step S202).

The information used to decode the program is, for example, information required to decode the program when the program is executed. Examples of information required to decode a program during execution of the program include offset, a type of relocation entry, and information used to calculate relocation information.

Then, an output unit 135 of the program protection device 100 outputs an encoded program in which information used for decoding the encoded program is stored in a relocation table as a protected program (step S203).

As described above, the program protection device 100 stores in advance the code and data portion of the program to be protected in the relocation table as information determined at the time of execution of the program. Specifically, the program protection device 100 creates an entry including information required to decode encoded codes and data.

Thus, the program protection device 100 causes the loader (dynamic linker) to decode the code and data of the protected program on the basis of the information of the entry, and the original code can be restored. The program protection device 100 encodes the program to be protected, as in the case of the first protection method described above. However, the program protection device 100 does not cause a decoder given to the program to be protected to decode the encoded value, but causes a system program such as a loader (dynamic linker) to decode the encoded value.

For execution of the protected program, when the protected program is executed, a loader (dynamic linker), which is system software, decodes the encoded program on the basis of information of a relocation table of the protected program, and the decoded program is written back to the corresponding portion.

More specifically, first, when a protected program is executed, the loader (dynamic linker) scans the relocation table. Then, the loader (dynamic linker) specifies a location making use of information determined at the time of executing the protected program on the basis of the information stored in the relocation table, and determines information determined at the time of execution of the protected program from a calculation method of that information, the values and related information required for that calculation. Thereafter, the loader (dynamic linker) is configured to write the determined information to the specified location.

The program protection device 100 has resistance to the above-described method of the NPL 1. Further, the program protection device 100 can avoid a decrease in execution speed and a leakage of protection, such as the problem of the above-described second protection method.

With respect to the above-described resistance to the method of the NPL 1, when a program of an executable format stored on a disk is executed, the contents of the program are first developed on a memory. Then, after various processes required for executing the program (for example, initialization and rearrangement) are performed as necessary, and then the execution of the program is started. Various processes required for the development to the memory and the execution of the program are mainly performed by the codes of the OS and the system library. After the execution of the codes of the OS or library is completed, the codes in the program of this execution format are executed in such a manner that the codes are called from the OS, or codes of the library.

The above-described method of the NPL 1 is to capture a memory portion where writing and execution are performed after execution of an original entry point of a protected program as an original code. On the other hand, when the program is encoded by using the program protection device 100, the subject that writes into the memory is not the protected program itself but the loader (dynamic linker) of the system software. Therefore, in a method of monitoring writing and execution to a memory by a protected program such as the method of the NPL 1, it is impossible to find out a portion where a decoded instruction is written. As a result, such a method fails to extract the original code.

[5. Others]

Also, out of the pieces of processing that have been described in the embodiment, some pieces of processing that have been described as being executed automatically may also be executed manually. Alternatively, all or part of processes described as being manually performed can be automatically performed by known methods. In addition, information including the processing procedure, specific name, various data and parameters that are shown in the above documents and drawings may be arbitrarily changed unless otherwise described. For example, the various information shown in each figure is not limited to the information shown in the figure.

In addition, the components of each of the devices illustrated in the figure are illustrated as functional concept and do not necessarily need to be configured physically as illustrated in the figure. In other words, the specific aspects of distribution and integration of the devices are not limited to those illustrated in the drawings, all or part of the components may be distributed or integrated functionally or physically in desired units depending on various kinds of loads and states of use.

For example, a part or all of the storage unit 120 shown in FIG. 2 may be held in a storage server or the like instead of being held by the program protection device 100. In this case, the program protection device 100 acquires various information such as a protection target program by accessing a storage server.

[6. Hardware Configuration]

Figure 6:
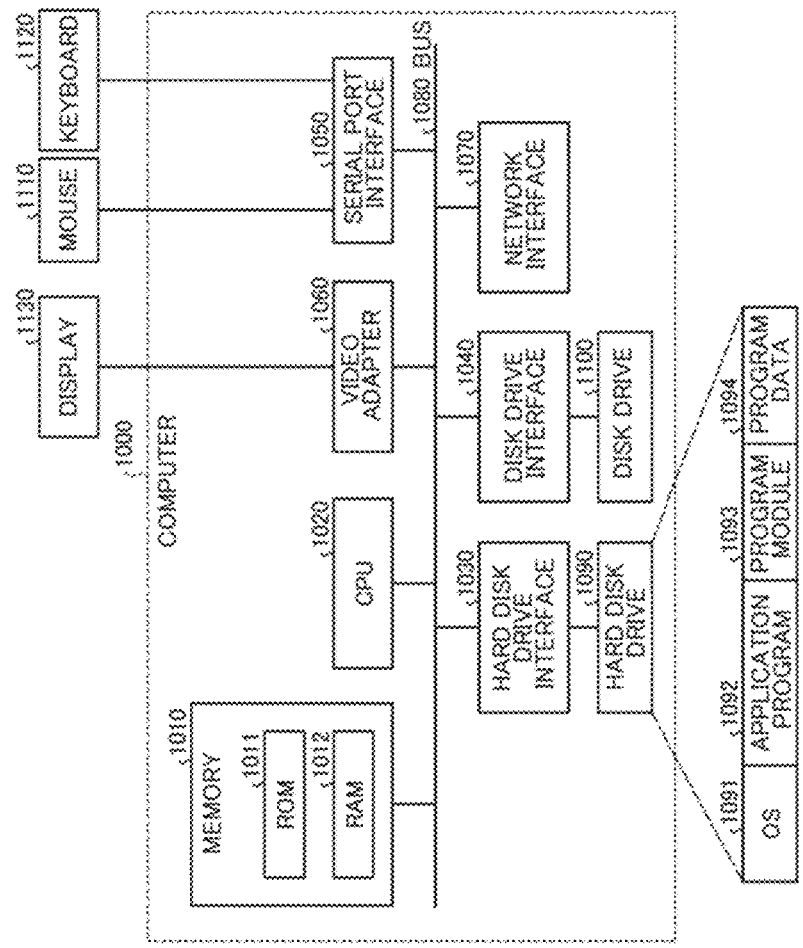
FIG. 6 is a diagram showing an example of a hardware configuration.

FIG. 6 is a diagram showing an example of a hardware configuration. The program protection device 100 according to the present embodiment is realized by, for example, a computer 1000 having a configuration as shown in FIG. 6.

FIG. 6 is a diagram showing an example of a computer in which the program protection device 100 is realized by executing a program. A computer 1000 includes, e.g., a memory 1010 and a CPU 1020. The computer 1000 also includes a hard disk drive interface 1030, a disk drive interface 1040, a serial port interface 1050, a video adapter 1060, and a network interface 1070. These units are connected by a bus 1080.

Memory 1010 includes ROM (Read Only Memory) 1011, and RAM 1012. ROM 1011 stores a boot program, such as a BIOS (Basic Input Output System). The hard disk drive interface 1030 is connected to a hard disk drive 1090. The disk drive interface 1040 is connected to a disk drive 1100. For example, a removable storage medium such as a magnetic disk and an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 includes, for example, an OS 1091, an application program 1092, a program module 1093, Program data 1094 is stored. That is, a program for defining each process of the program protection device 100 is implemented as a program module 1093 in which codes executable by the computer 1000 are described. The program module 1093 is stored in, for example, a hard disk drive 1090. For example, a program module 1093 for executing the same processing as the functional configuration of the program protection device 100 is stored in the hard disk drive 1090. The hard disk drive 1090 may be replaced by an SSD (Solid State Drive).

Further, setting data to be used in the process of the embodiment described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the program module 1093 or the program data 1094.

Note that the program module 1093 and program data 1094 are not limited to being stored in the hard disk drive 1090, and may also be stored in, for example, a removable storage medium and read out by the CPU 1020 via the disk drive 1100, etc. Alternatively, the program module 1093 and program data 1094 may be stored in other computers connected via a network and WAN. Then, the program module 1093 and program data 1094 may be read out from the other computers via the network interface 1070 by the CPU 1020.

[7. Effects]

As described above, the program protection device 100 according to the embodiment includes the encoding unit 133 and the output unit 135.

In a program protection device 100 according to an embodiment, an encoding unit 133 encodes a program to be protected according to a specific encoding algorithm, and the program is stored in a relocation table of the encoded program. In the program protection device 100 according to the embodiment, the output unit 135 outputs the program encoded by the encoding unit 133 as a protected program.

Thus, the program protection device 100 according to the embodiment can improve protection of the program.

In a program protection device 100 according to an embodiment, an encoding unit 133 encodes at least a part of values of a program to be protected according to a specific encoding algorithm, and the encoded value is stored in a relocation table as information to be used for decoding the encoded program.

Thus, the program protection device 100 according to the embodiment can enhance resistance to an analysis method in which static analysis and dynamic analysis are combined.

In a program protection device 100 according to an embodiment, an encoding unit 133 encodes an entry of a relocation table, The information used for decoding the encoded program is stored in a relocation table.

Thus, the program protection device 100 according to the embodiment can prevent a reverser for analyzing a protected program from reading an encoding algorithm from the relocation table.

The program protection device 100 according to the embodiment includes an area allocation unit 132 for allocating an area for arranging the relocation table to the program to be protected. Further, in the program protection device 100 according to the embodiment, the encoding unit 133 creates an entry including information used for decoding the encoded program in a relocation table arranged in an area allocated to the program to be protected.

Thus, the program protection device 100 according to the embodiment can encode the program to be protected so that the size of the protected program is not too large.

The program protection device 100 according to the embodiment further includes a header modification unit 134 for modifying header information used for a dynamic link in the encoded programs on the basis of a relocation table for storing information used for decoding the encoded program.

Thus, in the program protection device 100 according to the embodiment, the loader can appropriately arrange the decoded program on the memory.

While some of the embodiments of the present application have been described in detail with reference to the drawings, these are illustrative and the present invention is not limited to specific examples. The features described herein can be implemented in various modifications, improvements based on the knowledge of those skilled in the art, including aspects described in the column of aspects for implementing the invention.

Further, the above-mentioned "unit (section, module, and unit" can be read by "means", "circuit" and the like. For example, the encoding unit can be read by the encoding means or the encoding circuit.

REFERENCE SIGNS LIST

1 Program protection system
100 Program protection device
110 Communication unit
120 Storage unit
121 Protection target program storage unit
122 Protected program storage unit
130 Control unit
131 Receiving unit
132 Area allocation unit
133 Encoding unit
134 Header modification unit
135 Output unit
200 Program management device

The invention claimed is:

1. A program protection device, comprising:
encoding circuitry that encodes a program to be protected according to a specific encoding algorithm and stores information used to decode an encoded program in a relocation table of the encoded program; and
output circuitry that outputs a program encoded by the encoding circuitry as a protected program,
wherein the encoding circuitry encodes at least a part of values of the program to be protected according to the specific encoding algorithm, and stores the encoded value in the relocation table as information to be used for decoding the encoded program.

2. The program protection device according to claim 1, further comprising:
area allocation circuitry for allocating an area for arranging the relocation table to the program to be protected,
wherein the encoding circuitry creates an entry including information used for decoding the encoded program in the relocation table arranged in an area allocated to the program to be protected.

3. The program protection device according to claim 1, further comprising:
a header modification circuitry for modifying header information used for a dynamic link in the encoded programs on the basis of the relocation table for storing information used for decoding the encoded program.

4. A program protection device, comprising:
encoding circuitry that encodes a program to be protected according to a specific encoding algorithm and stores information used to decode an encoded program in a relocation table of the encoded program; and
output circuitry that outputs a program encoded by the encoding circuitry as a protected program, wherein the encoding circuitry encodes an entry of the relocation table, and stores an encoded entry as information used for decoding the encoded program, in the relocation table.

5. The program protection device according to claim 4, further comprising:
area allocation circuitry for allocating an area for arranging the relocation table to the program to be protected,
wherein the encoding circuitry creates an entry including information used for decoding the encoded program in the relocation table arranged in an area allocated to the program to be protected.

6. The program protection device according to claim 4, further comprising:
a header modification circuitry for modifying header information used for a dynamic link in the encoded programs on the basis of the relocation table for storing information used for decoding the encoded program.

7. A program protection method, comprising:
encoding a program to be protected according to a specific encoding algorithm and stores information used to decode an encoded program in a relocation table of the encoded program; and outputting a program encoded by the encoding process as a protected program,
wherein the encoding encodes an entry of the relocation table, and stores an encoded entry as information used for decoding the encoded program, in the relocation table.

8. The program protection method according to claim 7, further comprising:
allocating an area for arranging the relocation table to the program to be protected,
wherein the encoding creates an entry including information used for decoding the encoded program in the relocation table arranged in an area allocated to the program to be protected.

9. The program protection method according to claim 7, further comprising:
modifying header information used for a dynamic link in the encoded programs on the basis of the relocation table for storing information used for decoding the encoded program.

* * * * *